United States Patent
Young (10) Patent No.: US 8,904,365 B2
(45) Date of Patent: Dec. 2, 2014

(54) DYNAMIC MEDIA CONTENT INSTANTIATION FRAMEWORK

(75) Inventor: Stacy T. Young, Kanata (CA)

(73) Assignee: Adobe Systems Incorporated, San Jose, CA (US)

( * ) Notice: Subject to any disclaimer, the term of this patent is extended or adjusted under 35 U.S.C. 154(b) by 1275 days.

(21) Appl. No.: 12/550,094

(22) Filed: Aug. 28, 2009

(65) Prior Publication Data

US 2014/0289713 A1 Sep. 25, 2014

(51) Int. Cl.
*G06F 9/44* (2006.01)

(52) U.S. Cl.
USPC .......................................... 717/140

(58) Field of Classification Search
USPC .......................................... 717/140
See application file for complete search history.

(56) References Cited

U.S. PATENT DOCUMENTS

2008/0271127 A1* 10/2008 Naibo et al. ........................ 726/6
2009/0171754 A1* 7/2009 Kane et al. ........................ 705/10
2010/0058220 A1* 3/2010 Carpenter ..................... 715/772

OTHER PUBLICATIONS

Northover, "Creating Your Own Widgets using SWT", Mar. 22, 2001, pp. 1-18.*
Moore, "Foundation ASP.NET for Flash", Nov. 2, 2006, pp. 309-343.*
Adobe, "Adobe Air: Deliver Rich Internet Applications on the Desktop," Datasheet, Feb. 2008.
Adobe, Developing Adobe Air 1.5 Applications with Adobe Flash CS4 Professional, 2009.
Adobe, Developing Adobe Air 1.5 Applications with Adobe Flex 3, 2009.
Adobe, "Adobe Flex Builder 3: Creating Engaging, Cross-Platform Rich Internet Applications," Datasheet, 2007.
"Eclipse Platform Technical Overview," Object Technology International, Inc., Feb. 2003 (updated for 2.1: originally published Jul. 2001).
Adobe, Adobe Flash CS3 Professional: Create and Deliver Rich, Interactive Content, Datasheet, Feb. 2007.
Adobe, "Adobe Flex Builder 3: Using Adobe Flex Builder 3," 2008.
"SWT: The Standard Widget Toolkit, Part 1: Implementation Strategy for Java Natives," Object Technology International, Inc., 2001.
"SWT: The Standard Widget Toolkit, Part 2:Managing Operating system Resources," Object Technology International, Inc., 2001.
"Getting Across to Flash with Java," Java Compatible, Flash Magazine 2009.
"Developing SWT Applications using Eclipse," Eclipse, 2009.

* cited by examiner

*Primary Examiner* — Li B Zhen
*Assistant Examiner* — Duy Khuong Nguyen
(74) *Attorney, Agent, or Firm* — Kilpatrick Townsend & Stockton LLP (57) ABSTRACT

Methods and apparatus for the dynamic instantiation of media platform components, for example Adobe® Flash® visual components, in runtime environments. A dynamic media content instantiation framework may enable media platform components to be dynamically instantiated within runtime environments without requiring extensive code. A developer may obtain a library of media platform component definitions. Instead of coding a view's interface in the programming language of the runtime environment, the developer can simply reference the desired media platform resource in the library with as little as a single line of code. At runtime, the framework dynamically instantiates a requested media platform component from the definition of the component in the library, attaches the component instance to a stage, and provides a reference to the stage back to the runtime environment layer so that the content can be displayed.

20 Claims, 6 Drawing Sheets

DYNAMIC MEDIA CONTENT INSTANTIATION FRAMEWORK

BACKGROUND

Description of the Related Art

A media platform provides media authoring tools and runtime systems to create and deliver various media content in various application environments, including but not limited to web environments, desktop environments, and mobile device environments. Media content may include visual content (text, images, drawings, user interface elements, dialogs, windows, etc.), audio content, animated content, video, or combinations of various media content forms, generally referred to as multimedia. Adobe® Flash® is an example of a media platform. The Flash® platform is an integrated set of technologies that provides tools to create and deliver applications, media content, and/or multimedia content over the web or through other channels, including but not limited to desktop applications. The Flash® platform provides media authoring tools and media presentation systems (e.g., playback systems) based on a family of Flash® software products, also referred to as Flash® technology.

In Flash® technology, a stage is, or specifies, a region or area, typically rectangular, in which Flash® content is rendered in a target display. More specifically, in Flash® technology, a stage is a class that represents a Flash® drawing area in which Flash® content is rendered. For example, for SWF (Shockwave® Format) content running in a browser (e.g., in Flash® Player), a stage represents the entire area where Flash® content is rendered. For content running in Adobe® AIR® (Adobe® Integrated Runtime), each NativeWindow object has a corresponding stage object. Flash® content generally consists of Flash® components. A Flash® component may be a single component or may be a collection of components. Flash® components may include, but are not limited to, visual components (i.e., visual media content). Visual components are components that are visible when displayed to a screen, and may include anything from simple backgrounds and images to text to single user interface elements to complex dialogs including multiple user interface elements. Adobe® Flex® and Adobe® ActionScript® technologies are tools provided by the Flash® platform that may be used to develop Flash® components, specifically, but not limited to, Flash® visual components.

Flash® content, including Flash® visual components, may be incorporated into applications in various runtime environments, including runtime environments of platform-independent, object-oriented programming languages, for example the Java® programming language, as well as native language runtime environments, such as C++ applications. Conventionally, incorporating Flash® content, for example Flash® visual components, into an application for a runtime environment has required extensive code to be written in the programming language of that runtime environment to instantiate a stage and to render Flash® content to the stage. In addition, some conventional methods have required desired Flash® content to be statically instantiated into a Flash® application prior to loading the Flash® content into an application of the runtime environment.

Adobe®, Flash®, Shockwave®, Flex®, ActionScript® and AIR® are either registered trademarks or trademarks of Adobe Systems Incorporated in the United States and/or other countries.

SUMMARY

Various embodiments of methods and apparatus for the dynamic instantiation of media platform components, for example Adobe® Flash® visual components, in runtime environments are described. Embodiments may provide a dynamic media content instantiation framework via which media platform components may be dynamically instantiated within runtime environments without requiring extensive code to be written in the programming language of the runtime environment. The dynamic media content instantiation framework thus allows developers familiar with media platform technology to build applications that use media platform components in various runtime environments without expertise in the programming languages of the runtime environments. The runtime environments may include runtime environments of platform-independent, object-oriented programming languages, for example the Java® programming language, as well as native language runtime environments, such as C++ applications. An example software development tool in which embodiments of the dynamic media content instantiation framework may be employed is Eclipse, a multi-language software development environment that may be used to develop applications, specifically in Java®.

Media content, as used herein, may be represented in a media platform by media platform components. Media platform components include, but are not limited to, visual components, for example Flash® visual components, that represent visual content (text, images, drawings, user interface elements, dialogs, windows, etc.) A media platform component may represent a single content (i.e., may be a single component) or may represent a collection of contents (i.e., a component may represent a collection of components each representing a single content or a collection of contents). A media platform may provide tools for developing media platform components. For example, the Flash® platform provides Adobe® Flex® and Adobe® ActionScript® technologies as tools that may be used to develop Flash® components, specifically, but not limited to, Flash® visual components. Embodiments of the dynamic media content instantiation framework are primarily directed to visual content represented by visual components. However, some embodiments may support other types of media content, including but not limited to multimedia content.

Using the dynamic media content instantiation framework, a developer can obtain, or create, a library of definitions for media platform components, for example Flash® visual components. For example, the library may be an SWC (Shockwave® Component) library. Views may be represented by specific media platform visual components via the framework. Instead of coding a view's interface in the programming language of the runtime environment, for example the Java® programming language, the developer can simply reference a desired media platform visual component with as little as a single line of code.

At runtime, a runtime environment (e.g., a Java® runtime environment) layer of the dynamic media content instantiation framework calls into the media platform runtime environment (e.g., a Flash® runtime environment) layer of the dynamic media content instantiation framework to request specific media platform components. The dynamic media content instantiation framework instantiates a media platform runtime instance, if one is not already instantiated. The dynamic media content instantiation framework dynamically instantiates a requested media platform component from the definition of the component in the library, acquires a stage, for example from the media platform runtime instance, attaches the component instance to a stage, and provides a reference to the stage back to the runtime environment layer so that the media platform content can be displayed in a view on a target display. A stage is, or specifies, a region or area, typically rectangular, in which media platform content, for example Flash® content, is rendered in a target display. A view may be considered as the visual display of a stage and its associated component.

As noted above, the dynamic media content instantiation framework instantiates a media platform runtime instance, if one is not already instantiated, at runtime. This may be done either during startup of the application or upon receiving a request for a media platform component. In some embodiments, a single media platform runtime instance is instantiated during runtime of the application that may support multiple stages, where each stage is associated with one of the requested media platform components, and where each stage is associated with one view.

The dynamic media content instantiation framework operates in an asynchronous fashion. The dynamic media content instantiation framework accounts for the initialization process of the media platform format (e.g., SWF (Shockwave® Format)), the instantiation of a media platform runtime instance, and the routing and relaying of command messages between the runtime environment (e.g., a Java®/Eclipse environment) and the media platform runtime environment. In some embodiments, communications between the runtime environment and the media platform runtime environment may be performed via a socket server implementation and a messaging gateway that routes command objects back and forth between the environments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for the dynamic instantiation of media platform components, for example Adobe® Flash® visual components, in runtime environments are described. Embodiments may provide a dynamic media content instantiation framework via which media platform components may be dynamically instantiated within runtime environments without requiring extensive code to be written in the programming language of the runtime environment. The dynamic media content instantiation framework thus allows developers familiar with media platform technology to build applications in various runtime environments that use media platform components without expertise in the programming languages of the runtime environments.

Media content, as used herein, may be represented in a media platform by media platform components. Media platform components include, but are not limited to, visual components, for example Flash® visual components, that represent visual content (text, images, drawings, user interface elements, dialogs, windows, etc.) A media platform component may represent a single content (i.e., may be a single component) or may represent a collection of contents (i.e., a component may represent a collection of components each representing a single content or a collection of contents). A media platform may provide tools for developing media platform components. For example, the Flash® platform provides Adobe® Flex® and Adobe® ActionScript® technologies as tools that may be used to develop Flash® components, specifically, but not limited to, Flash® visual components. Embodiments of the dynamic media content instantiation framework are primarily directed to visual content represented by visual components. However, some embodiments may support other types of media content, including but not limited to multimedia content.

Dynamic instantiation refers to the fact that a media platform component may be instantiated during execution of an application's code when the component is requested by the application rather than statically instantiated prior to execution of the application. Runtime environments may include runtime environments of platform-independent, object-oriented programming languages, for example the Java® programming language, as well as native language runtime environments, such as C++ applications. While Java® technology is used as an example in this document, it is to be understood that embodiments may also be applied in other programming environments. A media platform provides media authoring tools and runtime systems to create and deliver media content in various application environments, including but not limited to web environments, desktop environments, and mobile device environments. Adobe® Flash® technology is an example of a media environment. While Adobe® Flash® technology is used as an example throughout this document, it is to be understood that embodiments of the framework may also be applied to other media platforms.

Embodiments of the dynamic media content instantiation framework may be instantiated in various software development tools to enable the development of applications in which media platform components, specifically visual components, may be dynamically instantiated within runtime environments of the applications as described herein. An example software development tool in which embodiments of the dynamic media content instantiation framework may be employed is Eclipse, a multi-language software development environment that may be used to develop applications, specifically in Java but also in other languages including but not limited to C, C++, Python, and Perl. Eclipse employs plug-ins to provide functionality on top of the runtime system. Conventionally, Eclipse developers have relied the Standard Widget Toolkit (SWT), an open source widget toolkit for Java®, to compose user interfaces for Java® applications. Techniques for including Flash® content in Java® applications using Eclipse exist; however, these conventional techniques require the Flash® content to be statically instantiated into a Flash® application prior to loading the Flash® content into the Java® application in the Java® runtime environment, and also require extensive Java® code to load the Flash® content in the Java® application.

Embodiments of the dynamic media content instantiation framework enable Eclipse plug-in developers to use Flash® technology, instead of or in addition to SWT, to compose user interfaces from Flash® visual components. In contrast to conventional techniques, embodiments of the dynamic media content instantiation framework do not require the Flash® content to be statically instantiated into a Flash® application prior to loading the Flash® content into the Java® application. Instead, Flash® content is dynamically instantiated at runtime when the content is needed. Furthermore, a Flash® component may be instantiated in the Java® application using a single line of Java® code. While Eclipse is used as an example of a software development tool in which embodiments may be instantiated, it is to be understood that embodiments may also be instantiated in other software development tools.

Figure 1:
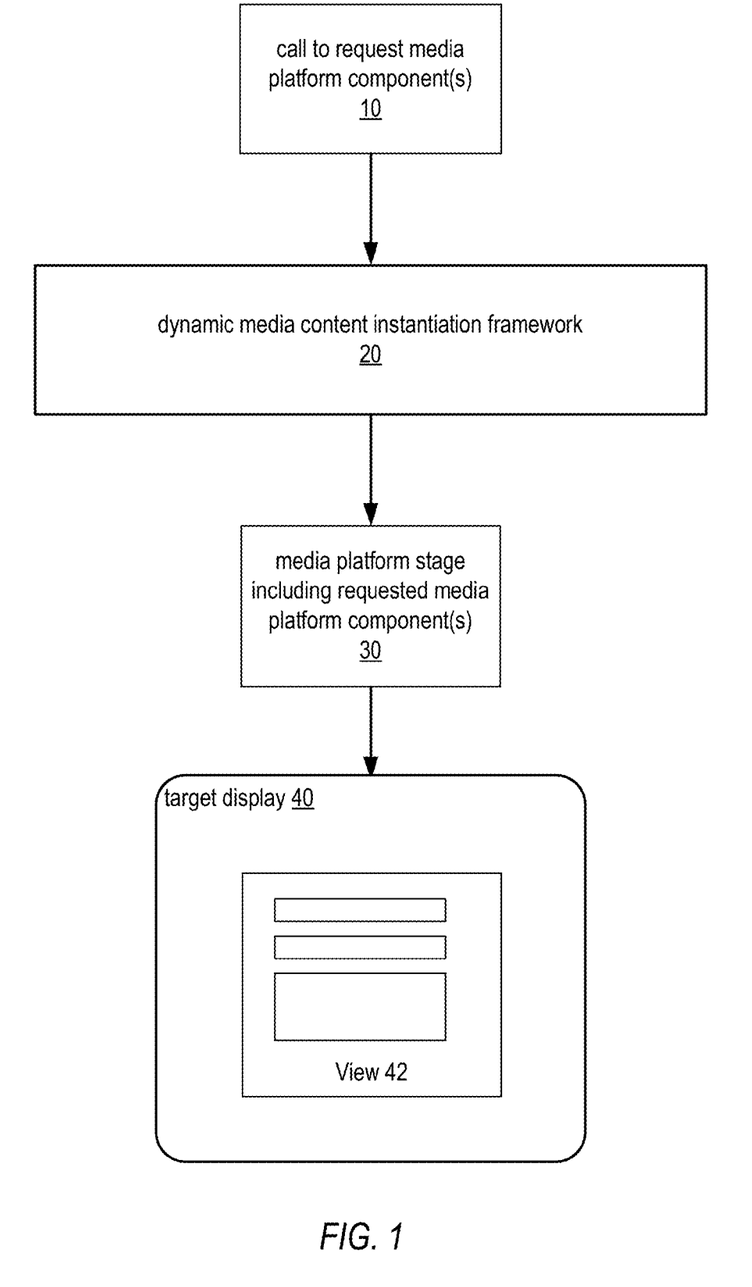
FIG. 1 is a block diagram that provides a high-level view of a dynamic media content instantiation framework, according to some embodiments.

FIG. 1 is a block diagram that provides a high-level view of a dynamic media content instantiation framework, according to some embodiments. Using the dynamic media content instantiation framework 20, a developer can obtain, or create, a library of definitions for media platform components, for example Flash® components. For example, the library may be an SWC (Shockwave® Component) library. In some embodiments, the dynamic media content instantiation framework automatically handles instantiation of a media platform runtime instance, for example a Flash® runtime instance, at runtime, if one is not already instantiated. In some embodiments, the developer may include code, in the programming language of the runtime environment, which requests that a media platform runtime instance be loaded, or that causes a media platform runtime instance be loaded, upon execution. Views may be represented by specific media platform components, for example Flash® components, via the framework 20. Instead of coding a view's interface in the programming language of the runtime environment, for example Java®, the developer can simply reference the desired media platform resource with as little as a single line of code. The following is an example of a line of code in Java® requesting a specific Flash® component, and is not intended to be limiting:

ApeView apeView=apeViewManager.register("com.adobe.ape.sample.Canvas", parent);

At runtime, a runtime environment (e.g., a Java® runtime environment) layer of the dynamic media content instantiation framework 20 calls into the media platform runtime environment layer of the dynamic media content instantiation framework 20, for example a Flash® runtime environment layer, to request specific media platform components, as indicated by call 10. The dynamic media content instantiation framework 20 dynamically instantiates a requested media platform component, for example a Flash® visual component, from the definition of the component in the library, attaches the component instance to a stage, and provides a reference to the stage back to the runtime environment layer, as indicated by 30, so that the media platform content can be displayed in a view 42 on a target display 40. A stage is, or specifies, a region or area, typically rectangular, in which media platform content, for example Flash® visual content, is rendered in a target display. A view may be considered as the visual display of a stage and its associated component(s).

As noted above, the dynamic media content instantiation framework instantiates a media platform runtime instance, if one is not already instantiated, at runtime. This may be done either during startup of the application or upon receiving a request for a media platform component. In some embodiments, a single media platform runtime instance is instantiated during runtime of the application that may support multiple stages, where each stage is associated with one of the requested media platform components, and where each stage is associated with one view. While the above describes a single component as attached to a stage, in some embodiments, multiple components may be attached to a single stage.

The dynamic media content instantiation framework operates in an asynchronous fashion. The dynamic media content instantiation framework accounts for the initialization process of the media platform format (e.g., SWF (Shockwave® Format)) and the routing and relaying of command messages between the runtime environment (e.g., a Java®/Eclipse environment) and the media platform runtime instance. In some embodiments, communications between the runtime environment and the media platform runtime instance may be performed via a socket server implementation and a messaging gateway that routes command objects back and forth between the layers.

Figure 2:
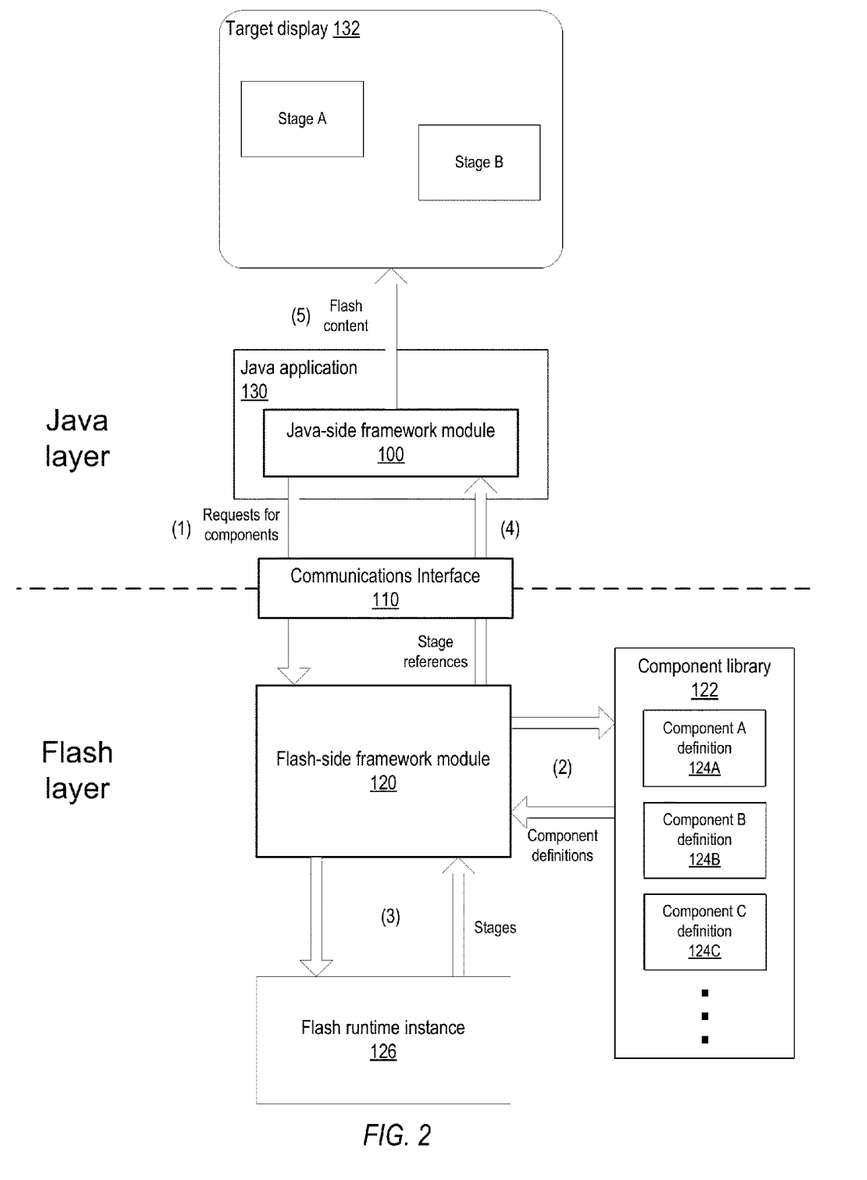
FIG. 2 is a block diagram illustrating an architecture for, and operations of, a dynamic media content instantiation framework, according to some embodiments.

FIG. 2 is a block diagram illustrating an architecture for, and operations of, a dynamic media content instantiation framework, according to some embodiments. While a Java® environment is used as an example in this Figure, it is to be understood that embodiments may also be applied in other programming environments. The framework may include framework modules in both the Java® layer and the Flash® layer, designated as Java-side framework module 100 and Flash-side framework module 120, respectively. The framework may also include a communications Interface 110 for messaging between Java-side framework module 100 and Flash-side framework module 120.

To use the dynamic media content instantiation framework for developing an application 130 that leverages Flash® technology to display Flash® components, a developer may obtain, or create, a library of definitions 124 for Flash® components, designated as component library 122. Each Flash® component may be associated with a unique identifier that may be used to reference the respective definition 124. The library may, for example, be an SWC library. In some embodiments, more than one library 122 may be used in an application via the framework. In the application code, in the programming language of the runtime environment, the developer includes code that requests particular Flash® components. A Flash® component may be requested with a single line of Java® code. The following is an example of a line of code in Java® requesting a specific Flash® component, and is not intended to be limiting:

ApeView apeView=apeViewManager.register("com.adobe.ape.sample.Canvas", parent);

In the example code, "com.adobe.ape.sample.Canvas" represents the unique identifier for a particular Flash® component for which a definition 124 is included in component library 122.

Operations at runtime are indicated by (1) through (5). At (1), when code requesting a particular Flash® component is executed, Java-side framework module 100 messages Flash-side framework module 120, via communications interface 110, with a request for the particular component. The request may include, but is not limited to, a unique identifier for the particular Flash® component. The dynamic media content instantiation framework instantiates a Flash® runtime instance 126, if one is not already instantiated. At (2), Flash-side framework module 120 obtains a definition 124 for the requested Flash® component from library 122 and instantiates an instance of the requested Flash® component from the definition 124. At (3), Flash-side framework module 120 obtains a stage for the component instance from Flash® runtime instance 126. Note that (2) and (3) may be performed in either order, and may be performed sequentially or in parallel. Flash-side framework module 120 then attaches the component instance to the obtained stage, and at (4) messages Java-side framework module 100, via communications interface 110. The message may include a reference to the stage to which the instance of the requested Flash® component is attached. At (5), the stage, and the respective Flash® component, may be displayed to target display 132.

While the above describes a single Flash® component as attached to a stage, in some embodiments, multiple Flash® components may be attached to a single stage.

Figure 3:
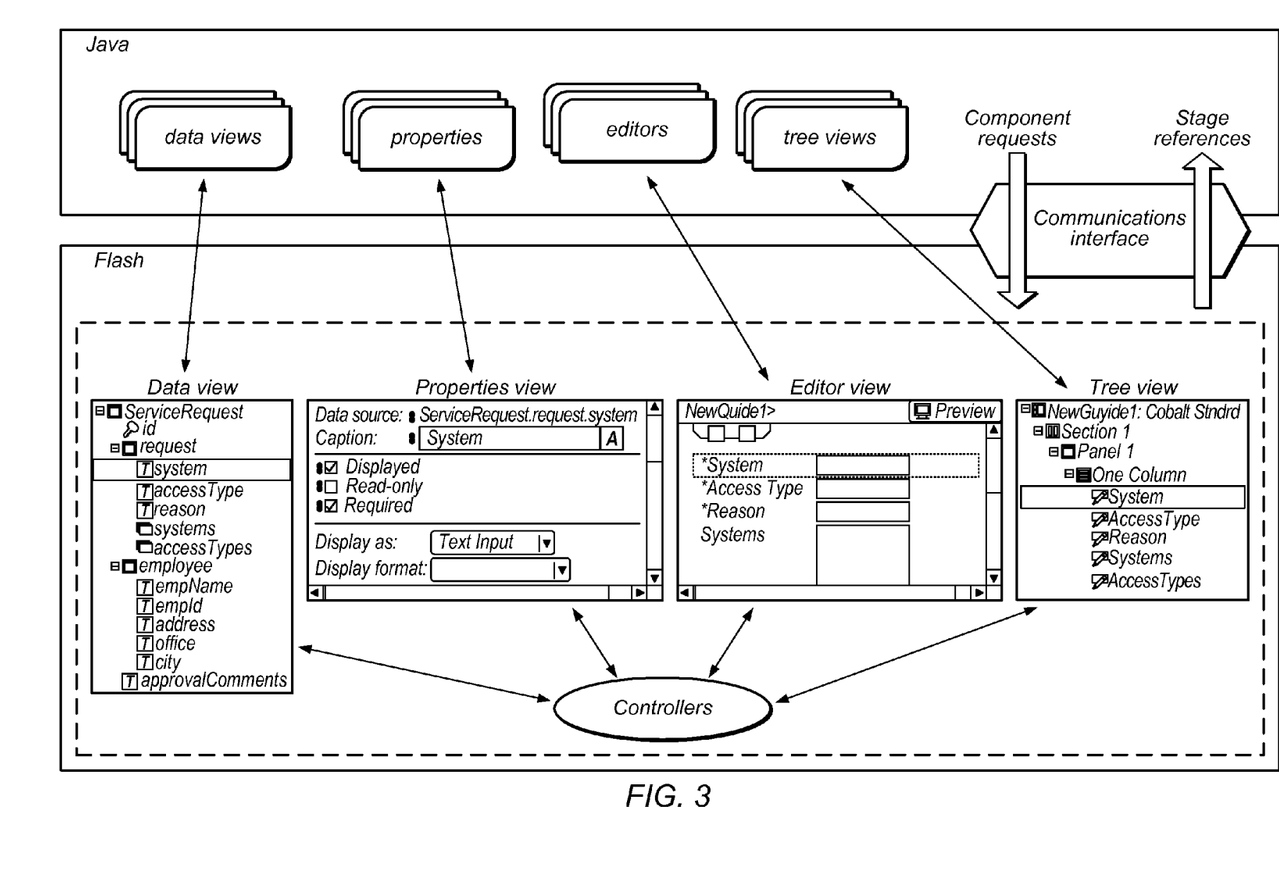
FIG. 3 is a block diagram illustrating an example of an application that incorporates both Java® and Flash® runtime environments and in which the dynamic media content instantiation framework is used leverage Flash® technology to display Flash® components as views in the application, according to some embodiments.

FIG. 3 is a block diagram illustrating an example of an application that incorporates both Java® and Flash® runtime environments and in which the dynamic media content instantiation framework is used leverage Flash® technology to display Flash® components as views in the application, according to some embodiments. Opening the application, or an event within the application while the application is executing, may result in one or more "views" being displayed in a context such as a window, dialog, or web page on a target display (being displayed to a context, such as a window, on a target display). At least some of the views may be instances of Flash® stages each displaying Flash® component(s). Each Flash® component is dynamically instantiated by the dynamic media content instantiation framework, and is associated with the respective stage by the framework, as previously described. When Java® code is executed to instantiate or modify a context or view, one or more requests may be made to the Flash-side component of the framework via the communications interface of the framework. The Flash-side component of the framework may then instantiate the indicated Flash® component(s) from their respective descriptions, attach the component(s) to Flash® stages, and return references to the stages to the Java® runtime environment. The Flash® stages may then be displayed as or in a view on the target display. Controllers in the Flash® runtime environment may allow the various stages to be aware of each other. The controllers may, for example, allow content to be dragged from one view to another, cause a change in one view to automatically update another view, and so on.

FIG. 3 show several different types of views as examples of Flash® content that may be displayed in Flash® stages by embodiments. An editor view may be used for editing documents/files of a specific type. Navigator/data views, such as data view and tree view in FIG. 3, may provide representations of resources or data structures that may be used within the context of the application. For example, a navigator/data view of an application that provides a development environment for building enterprise applications may display a list of available web services which the developer can explore to see available methods and return types. A property view may display properties of a selected object in an editor or navigator/data view.

While not shown, the application may also display one or user interface elements instantiated via some other means, for example via the Standard Widget Toolkit (SWT). Application logic may allow the Flash® stages/views to be aware of the other user interface elements, and vice versa.

Figure 4:
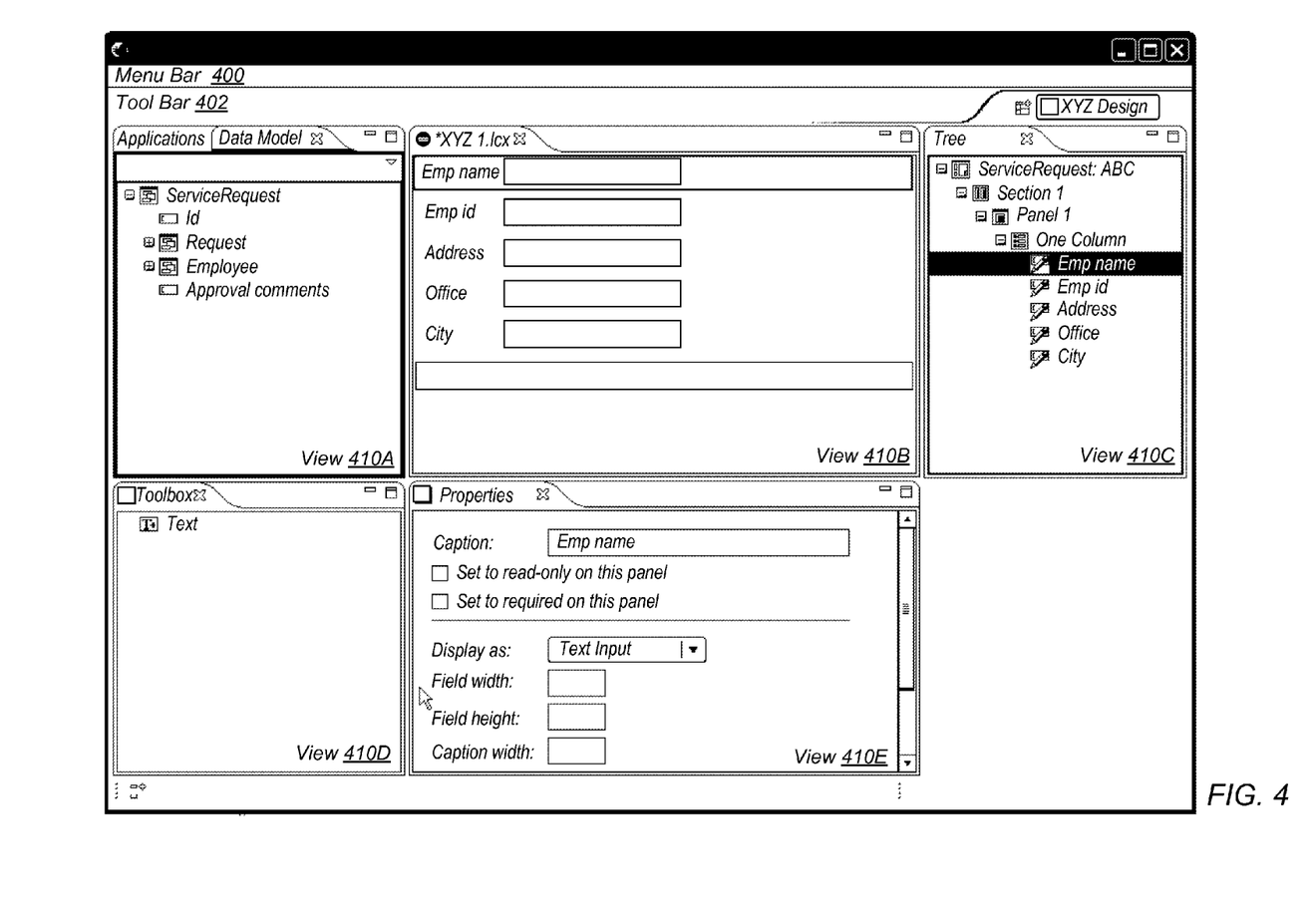
FIG. 4 shows an example of a user interface that may be displayed on a target display by an application such as the example application illustrated in FIG. 3, according to some embodiments.

FIG. 4 shows an example of a user interface that may be displayed on a target display by an application such as the example application illustrated in FIG. 3, according to some embodiments. The user interface may include, but is not limited to, a menu bar 400, a tool bar 402, and various views 410. Views 410A and 410C are examples of navigator/data views. View 410B is an example of an editor view. View 410E is an example of a properties view. View 410D is an example of a toolbox view that may be used to display various tools.

Note that the content of each of the views 410 in FIG. 4 is Flash® visual content described in respective component descriptions 124 included in the library 122 accessed by the framework to dynamically instantiate the respective Flash® visual components at runtime.

The types of views shown in FIGS. 3 and 4 are given as examples of Flash® visual content that may be displayed in Flash® stages by embodiments, and are not intended to be limiting. While embodiments are described in the context of instantiating and displaying Flash® visual content at runtime in applications developed in the programming language of the runtime environment, some embodiments of the framework may be used to dynamically instantiate and display any type of Flash® content at runtime in applications developed in the programming language of the runtime environment.

Figure 5:
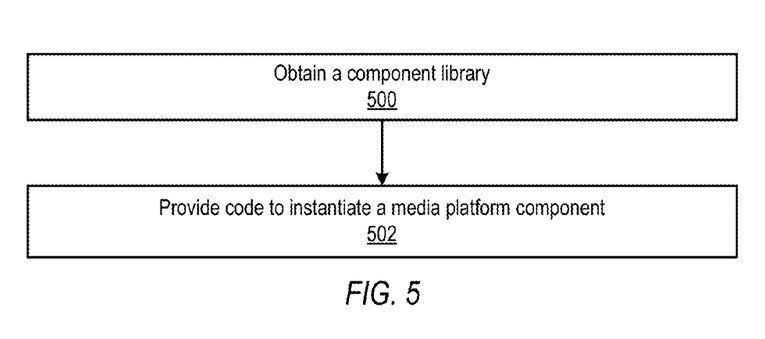
FIG. 5 is a flowchart of a method for developing applications according to the dynamic media content instantiation framework, according to some embodiments.

FIG. 5 is a flowchart of a method for developing applications according to the dynamic media content instantiation framework, according to some embodiments. As indicated at 500, the developer may obtain a component library that includes descriptions of various media platform components, for example Flash® platform visual components. To obtain the library, the developer may obtain an existing component library, may develop the component library from scratch, or may add to or otherwise modify an existing component library. Each component in the library may have an associated identifier that uniquely identifies the particular component in the library. In some embodiments, more than one component library may be obtained.

As indicated at 502, in application code, for example Java® code, the developer may include code at various places to instantiate one or more media platform components for which descriptions are included in the component library. In some embodiments, a single line of code may be included to instantiate a particular media platform component. The single line of code may include the unique identifier for the respective component.

Figure 6:
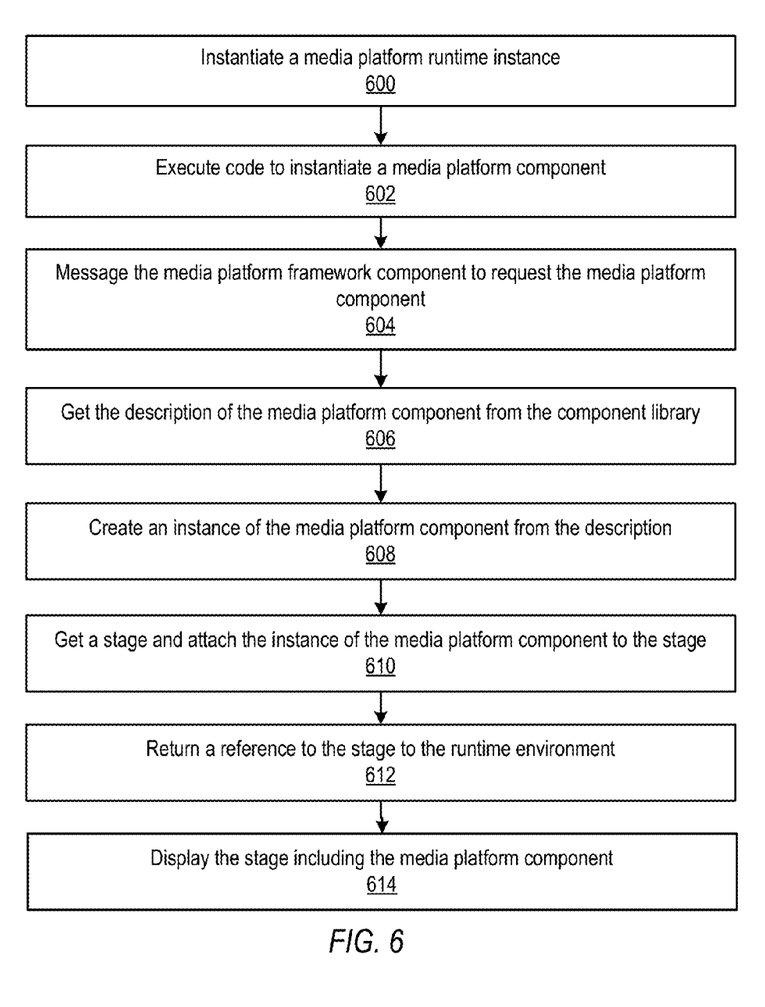
FIG. 6 is a flowchart of a method for dynamically instantiating and displaying media platform components in applications according to some embodiments of the dynamic media content instantiation framework.

FIG. 6 is a flowchart of a method for dynamically instantiating and displaying media platform components in applications according to some embodiments of the dynamic media content instantiation framework. As indicated at 600, a media platform runtime instance may be instantiated. For example, a Flash® runtime instance may be instantiated. The dynamic media content instantiation framework instantiates a media platform runtime instance, if one is not already instantiated, at runtime of the application. This may be done either during startup of the application or upon receiving a request for a media platform component. In some embodiments, a single media platform runtime instance is instantiated during runtime of the application that may support multiple stages, where each stage is associated with one of the requested media platform components. As indicated at 602, during execution of the application, code to instantiate a media platform component may be executed. In some embodiments, a single line of code, for example a single line of Java® code in a Java® application, may be executed to instantiate a particular media platform component. The dynamic media content instantiation framework may include a runtime environment framework module, a media platform framework module, and a communications interface for communicating between the modules. As indicated at 604, a runtime environment framework module (e.g., a Java® framework module) may message a media platform framework module via the communications interface requesting the media platform component. The message may include, but is not limited to, an identifier that uniquely identifies the particular component.

As indicated at 606, in response to the message requesting the media platform component, the media platform framework module may get the description of the media platform component from a component library, for example using the unique identifier to locate the component in the library. After obtaining the description from the library, the media platform framework module may create an instance of the media platform component from the description, as indicated at 608. As indicated at 610, the media platform framework module may then get a stage and attach the instance of the media platform component to the stage. In one embodiment, to get the stage, the media platform framework module may request a stage from the media platform runtime instance. As indicated at 612, the media platform framework module may return a reference to the stage to the runtime environment, for example by messaging the runtime environment framework module via the communications interface. As indicated at 614, the stage including the media platform component may be displayed to a target display.

Elements 602 through 614 of FIG. 6 may be repeated as the application continues to execute.

Example System

Figure 7:
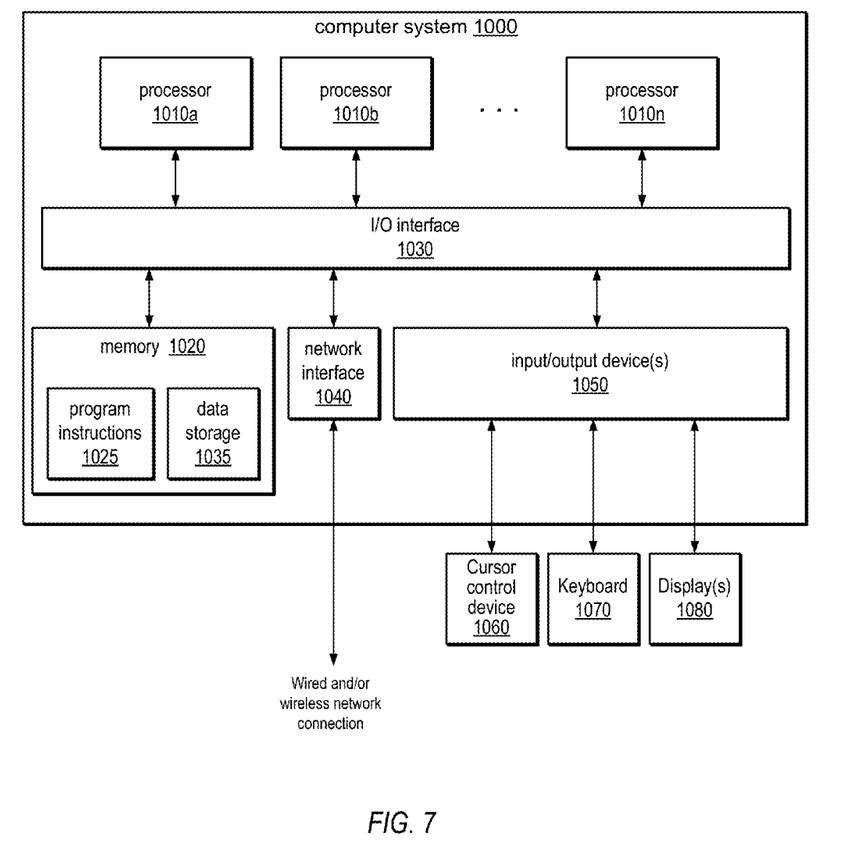
FIG. 7 illustrates an example computer system that may be used in embodiments.

Embodiments of a dynamic media content instantiation framework as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/flash-type memory, or any other type of memory. In the illustrated embodiment, program instructions and data implementing desired functions, such as those described above for embodiments of a dynamic media content instantiation framework are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of a dynamic media content instantiation framework as described herein, and data storage 1035, comprising various data accessible by program instructions 1025. In one embodiment, program instructions 1025 may include software elements of embodiments of a dynamic media content instantiation framework as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a dynamic media content instantiation framework as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method for implementing a dynamic media content instantiation framework, comprising:
   executing on a computer system an application in an application runtime environment, wherein the application comprises code for requesting a media platform component from a media platform runtime environment;
   executing on the computer system an application-side framework module within the application runtime environment, wherein the application-side framework module comprises code for receiving the request and passing the request via an interface to a media platform-side framework module;
   executing on the computer system the media platform-side framework module within the media platform runtime environment wherein the media platform-side framework module comprises code for:
      in response to the request, instantiating the media platform component by obtaining a description of the media platform component from a component library and dynamically generating the media platform component from the description;
      obtaining from a media platform runtime instance a media platform stage and attaching the media platform component to the stage, wherein the stage specifies a region in which media platform content is to be rendered on a display; and
      returning to the application-side framework module, via the interface, a reference to the stage; and
   wherein the application-side framework module further comprises code for displaying the stage and the attached media platform component on the display.

2. The computer-implemented method as recited in claim 1, wherein the application runtime environment is a Java technology runtime environment and the application is a Java application.

3. The computer-implemented method as recited in claim 1, wherein the media platform runtime environment is an Adobe Flash technology environment.

4. The computer-implemented method as recited in claim 1, wherein the media platform component is a visual component, and wherein the component library includes a plurality of descriptions of media platform visual components.

5. The computer-implemented method as recited in claim 1, wherein the media platform-side framework module further comprises code for instantiating the media platform runtime instance prior to receiving the request for the media platform component.

6. The computer-implemented method as recited in claim 1, wherein the media platform runtime instance is an Adobe Flash technology runtime instance.

7. The computer-implemented method as recited in claim 1, wherein the media platform-side framework module further comprises program instructions for instantiating the media platform runtime instance in response to receiving the request for the media platform component.

8. A system configured for implementing a dynamic media content instantiation framework, comprising:
   at least one processor;
   a display device; and
   a memory storing program instructions, executable by the at least one processor, comprising an application, an application-side framework module and a media platform-side framework module;
   wherein the application is executed in an application runtime environment and comprises one or more program instructions for requesting a media platform component from a media platform runtime environment;
   wherein the application-side framework module is executed in the application runtime environment and comprises program instructions for receiving the request and to passing the request via an interface to the media platform-side framework module;
   wherein the media platform-side framework module is executed within the media platform runtime environment and comprises program instructions for:
      in response to the request, instantiating the media platform component by obtaining a description of the media platform component from a component library and dynamically generating the media platform component from the description;
      obtaining from a media platform runtime instance a media platform stage and attaching the media platform component to the stage, wherein the stage specifies a region in which media platform content is to be rendered on the display device; and
      returning to the application-side framework module, via the interface, a reference to the stage; and
   wherein the application-side framework module further comprises program instructions for displaying the stage and the attached media platform component on the display device.

9. The system as recited in claim 8, wherein the application runtime environment is a Java technology runtime environment and wherein the application is a Java application.

10. The system as recited in claim 8, wherein the media platform runtime environment is an Adobe Flash technology environment.

11. The system as recited in claim 8, wherein the media platform component is a visual component, and wherein the component library includes a plurality of descriptions of media platform visual components.

12. The system as recited in claim 8, wherein the media platform-side framework module further comprises program instructions for instantiating the media platform runtime instance prior to receiving the request for the media platform component.

13. The system as recited in claim 8, wherein the media platform runtime instance is an Adobe Flash technology runtime instance.

14. The system as recited in claim 8, wherein the media platform-side framework module further comprises program instructions for instantiating the media platform runtime instance in response to receiving the request for the media platform component.

15. A non-transitory computer-readable storage medium storing program instructions, wherein the program instructions are computer-executable to implement a dynamic media content instantiation framework, wherein the program instructions comprise:
    an application configured to execute in an application runtime environment and comprising one or more program instructions for requesting a media platform component from a media platform runtime environment;
    an application-side framework module configured to execute in the application runtime environment;
    a media platform-side framework module configured to execute in the media platform runtime environment; and
    wherein the application-side framework module comprises program instructions for receiving the request for the media platform content and passing the request to the media platform-side framework module via an interface; and
    wherein the media platform-side framework module comprises program instructions for:
        instantiating the media platform content by obtaining a description of the media platform component from a component library and dynamically generating the media platform content from the description;
        obtaining from a media platform runtime instance a media platform stage and attaching the media platform component to the stage, wherein the stage specifies a region in which media platform content is to be rendered on a display device; and
        returning to the application-side framework module, via the interface, a reference to the stage; and
    wherein the application-side framework module further comprises program instructions for displaying the stage and the attached media platform content on the display device.

16. The non-transitory computer-readable storage medium as recited in claim 15, wherein the application runtime environment is a Java technology runtime environment, and wherein the media platform runtime environment is an Adobe Flash technology environment.

17. The non-transitory computer-readable storage medium as recited in claim 15, wherein the media platform content is visual content represented by media platform visual components.

18. The non-transitory computer-readable storage medium as recited in claim 15, wherein the media platform content includes visual content.

19. The non-transitory computer-readable storage medium as recited in claim 15, wherein the media platform-side framework module further comprises program instructions for instantiating the media platform runtime instance prior to receiving the request for the media platform component.

20. The non-transitory computer-readable storage medium as recited in claim 15, wherein the media platform-side framework module further comprises program instructions for instantiating the media platform runtime instance in response to receiving the request for the media platform component.

* * * * *